United States Patent [19]
Schmitt

[11] Patent Number: 5,668,696
[45] Date of Patent: Sep. 16, 1997

[54] CARRIER-BASED MOUNTING STRUCTURE FOR COMPUTER PERIPHERAL CHASSIS

[75] Inventor: Ty Schmitt, Round Rock, Tex.

[73] Assignee: Dell USA, L.P., Round Rock, Tex.

[21] Appl. No.: 421,656

[22] Filed: Jul. 10, 1995

[51] Int. Cl.$^6$ .................................................. H05K 7/00
[52] U.S. Cl. .......................... 361/685; 361/683; 361/724; 361/726; 439/928.1
[58] Field of Search ..................................... 361/683–686, 361/724–727, 732, 740, 754, 755, 759, 798, 801; 312/223.2, 244, 331–331.1, 334.23; 439/60, 152, 153, 157, 327, 328, 331, 345, 304, 928.1

[56] References Cited

U.S. PATENT DOCUMENTS

| | | | |
|---|---|---|---|
| 5,077,722 | 12/1991 | Geist et al. | 369/75.1 |
| 5,277,615 | 1/1994 | Hastings et al. | 439/377 |
| 5,325,263 | 6/1994 | Singer et al. | 361/683 |

Primary Examiner—Leo P. Picard
Assistant Examiner—Jayprakash N. Gandhi
Attorney, Agent, or Firm—Skjerven, Morrill, MacPherson, Franklin, & Friel, L.L.P.; Stephen A. Terrile

[57] ABSTRACT

A structure and method for removably mounting a chassis within a bay in a frame. The structure includes (1) a stationary mount coupled to an inner wall of the bay, the stationary mount having a mount guide rail and a cam slot associated therewith, (2) a chassis carrier having a cradle associated therewith for receiving a chassis and a carrier guide rail on an outer surface thereof and (3) a mounting handle, rotatably coupled to the chassis carrier to rotate between an insertion orientation and a mounted orientation, the mounting handle having a cam follower associated therewith, the mount and carrier guide rails engageable to guide the chassis carrier along a substantially linear path through the bay, the cam follower engageable with the cam slot only when the mounting handle is substantially in the insertion orientation, the cam follower traversing the cam slot to urge the chassis carrier along the substantially linear path toward a mounted position as the mounting handle is rotated toward the mounted orientation.

27 Claims, 8 Drawing Sheets

CARRIER-BASED MOUNTING STRUCTURE FOR COMPUTER PERIPHERAL CHASSIS

TECHNICAL FIELD OF THE INVENTION

The present invention is directed, in general, to computer systems and, more specifically a structure for removably mounting a computer peripheral chassis within a bay in a frame, the structure providing self-alignment, mechanical advantage for ease of insertion and removal of the chassis and positive latching for retaining the chassis in place.

BACKGROUND OF THE INVENTION

Eventually, stand-alone PCs evolved into PC networks, most often comprising a central network server from which client PCs branch. The network server is a focal point for processing and storage in the network, as the network server is responsible for distribution of application programs and data to the client PCs. Since they must serve as a focal point, network servers are typically outfitted with the latest, fastest, largest central processing unit ("CPU"), buses and random access memory ("RAM"). Further, such network servers are provided with at least one (and almost always more than one) large, fast hard disk drive providing nonvolatile storage for the application programs and data.

Network servers often employ more than one disk drive for three reasons. First, storage needs may exceed the capacity of today's largest single drives. Second, large drives are often more expensive per unit of storage than smaller drives. Third, it is advantageous from the standpoint of reliability to spread the application programs and data over multiple disks such that, if one disk fails, all is not lost. In fact, it has been recognized that an array of relatively inexpensive disks may act in concert to provide nonvolatile storage that is faster and more reliable than a single large expensive disk drive.

The technology to enable such inexpensive disks to cooperate advantageously is generally known as Redundant Array of Inexpensive Disks ("RAID") and is particularly useful in the environment of network servers. RAID provides data redundancy, such that if a single disk drive fails, the data stored thereon can be reconstructed from the data stored on the remaining disks. There are several levels of RAID, depending upon the degree of speed and reliability desired. The reader is directed to widely-available publications on RAID and the advantages thereof, as a general description of RAID is outside the scope of the present discussion.

In the most sophisticated network servers, a failed disk drive can be replaced and the data thereon restored by software without interrupting the server's operation. In so-called "hot plugging", the failed disk drive is removed and a new one installed in its place without cutting off the power to the drive.

Given the above, it is apparent that a network server is advantageously housed in a main chassis, or "frame", most often in the form of a tower, containing multiple bays for receiving the various hard disk drives that comprise the network server's nonvolatile storage. It is desirable to provide a rapid, convenient means of installing disk drives in, and removing disk drives from, the bays. It is especially desirable in the context of RAID, wherein a drive may be hot-plugged into the bay.

There are five attributes that a well-designed structure for removably mounting a disk drive chassis within a bay. First, the structure should provide mechanical advantage for ease of insertion and removal of the chassis. This reduces the force a user is required to exert to install or remove the chassis. Second, the structure should provide self-alignment for a carrier that cradles the chassis. Self-alignment ensures proper position and orientation for the chassis carrier and any movable parts associated with the chassis carrier (such as the mechanism affording mechanical advantage). Third, the structure should provide positive latching for retaining the chassis in place once installed. Fourth, the structure should provide a handle for carrying the disk drive when it is removed. Finally, the structure should be cost- and space-efficient.

There have been attempts in the past to provide removable installation of a disk drive chassis in a bay. In one system, a lever and cam mechanism is provided to give mechanical advantage to urge the drive into place, but the lever and gearing mechanism is located under the drive, limiting the number of drives that can be located in a vertical array of bays of a given height. The location of the lever and gearing mechanism further restricts air flow between the installed disk drives. Finally, the lever cannot be used as a handle once the disk drive is removed.

In another system, a handle and cam mechanism cooperate to give mechanical advantage to the user, but the handle must be aligned manually before the carrier can be fully inserted into the bay; there is no automatic alignment.

In yet another system, separate lever and cam mechanisms are located on either side of the disk drive carrier. However, the levers must be separately aligned manually before the carrier can be fully inserted into the bay; again, there is no automatic alignment. Further, the levers do not function well as a handle.

In still another system, a handle and slot/pin mechanism provides the necessary mechanical advantage for insertion and removal. However, there is no positive latching for retaining the chassis in place once installed. Thus, the chassis is free to separate from the frame once installed.

Accordingly, what is needed in the art is a structure for removably mounting a computer peripheral chassis within a bay in a frame that provides a handle for the disk drive, alignment of the chassis carrier, mechanical advantage for ease of insertion and removal of the chassis and positive latching for retaining the chassis in place.

SUMMARY OF THE INVENTION

To address the above-discussed deficiencies of the prior art, it is a primary object of the present invention to provide a means by which chasses may be quickly, easily and reliably mounted within, and removed from, a frame.

In the attainment of the above-described primary object, the present invention provides a structure and method for removably mounting a chassis within a bay in a frame. The structure comprises: (1) a stationary mount coupled to an inner wall of the bay, the stationary mount having a mount guide rail and a cam slot associated therewith, (2) a chassis carrier having a cradle associated therewith for receiving a chassis and a carrier guide rail on an outer surface thereof and (3) a mounting handle, rotatably coupled to the chassis carrier to rotate between an insertion orientation and a mounted orientation, the mounting handle having a cam follower associated therewith, the mount and carrier guide rails engageable to guide the chassis carrier along a substantially linear path through the bay, the cam follower engageable with the cam slot only when the mounting handle is substantially in the insertion orientation, the cam follower traversing the cam slot to urge the chassis carrier along the substantially linear path toward a mounted position as the mounting handle is rotated toward the mounted orientation.

Thus, the present invention introduces a structure that aligns and guides the chassis into a bay in the frame by means of a chassis carrier, guide rails and a novel cam arrangement to ensure that the handle is in the proper insertion orientation and to lend mechanical advantage to insertion and removal of the chassis carrier.

In a preferred embodiment of the present invention, the stationary mount and the mount handle have first and second gripping surfaces associated therewith, the first and second gripping surfaces cooperable with the cam follower and cam slot to urge the chassis carrier along the substantially linear path toward the mounted position as the mounting handle is rotated toward the mounted orientation.

The first and second gripping surface provide additional mechanical advantage to the cam and cam follower further to ease insertion and removal of the chassis carrier. In a more preferred embodiment, the first and second gripping surfaces take the form of meshing rack and pinion gears.

In a preferred embodiment of the present invention, the structure further comprises a second stationary mount coupled to an opposing inner wall of the bay, the second stationary mount having a second mount guide rail and a second cam slot associated therewith, the mounting handle having a second cam follower associated therewith, the second mount and carrier guide rails engageable to guide the chassis carrier along the substantially linear path, the second cam follower engageable with the second cam slot only when the mounting handle is substantially in the insertion orientation, the second cam follower traversing the second cam slot to urge the chassis carrier along the substantially linear path toward the mounted position as the mounting handle is rotated toward the mounted orientation.

Thus, the present invention preferably provides guides and cam arrangements on each side of the chassis carrier and the bay. Further, the present invention preferably provides that the handle actuate both of the cam followers simultaneously to effect linear insertion of the chassis carrier toward, or away from, its mounted position.

In a preferred embodiment of the present invention, the chassis carrier has a grounding conductor associated therewith, the grounding conductor couplable to the chassis when the chassis is received into the cradle, the grounding conductor having a resilient contact associated therewith, the resilient contact couplable to the frame to ground the chassis to the frame when the chassis carrier is in the mounted position.

Those of ordinary skill in the art are familiar with the need to ground chasses to one another for containing electromagnetic interference ("EMI") generated by high frequency electronic equipment, for dissipating electrostatic discharge and for providing a common electrical ground. The resilient contact more preferably slides against the frame as the chassis carrier slides within the bay.

In a preferred embodiment of the present invention, the chassis carrier has a circuit board slot and a grounding clip associated therewith, the circuit board slot adapted to receive a circuit board associated with the chassis, the grounding clip adapted to contact the circuit board resiliently to provide a ground for the circuit board.

Certain types of chassis, for instance those containing hard disk drives for computer systems, have circuit boards associated therewith that contain interface hardware allowing communication of data between the hard disk drive and the computer system. The present invention, in this preferred embodiment, makes provision for the associated circuit board on the chassis carrier and further provides a ground for the circuit board.

In a preferred embodiment of the present invention, the stationary mount has a duality of cam slots and gripping surfaces on opposite ends thereof, the stationary mount couplable to a selected one of the inner wall and an opposing inner wall of the bay. It is frequently preferable to eliminate the "handedness" of parts, such that the same part can be employed in both left-hand and right-hand positions. The present invention therefore provides a universal stationary mount that can be thus employed.

In a preferred embodiment of the present invention, the frame comprises a plurality of bays, each of the bays operable with the structure to receive the chassis. In the embodiment to be illustrated, a plurality of readily removable and mountable hard disk drives may be housed in the frame. Such an arrangement is particularly advantageous as part of a network server, wherein hard drive failure is not uncommon and, thus, easily replaceable hard drives may be hot-plugged into the server without interrupting the operation thereof.

In a preferred embodiment of the present invention, the cam slot comprises a retention structure, the retention structure engageable with the cam follower when the mounting handle is in the mounted orientation releasably to retain the chassis carrier in the mounted position. It is desirable to retain the chassis carrier in its mounted position to prevent the chassis contained thereby from separating from the frame. Accordingly, as will be described in a more preferred embodiment, the retention structure comprises a flexible ramp and integral detent upon which the cam follower rides.

In a preferred embodiment of the present invention, the stationary mount comprises a clip for releasably coupling the stationary mount to the inner wall of the bay. Although the broad scope of the present invention encompasses all manner of ways in which the stationary mount may be coupled to the inner wall of the bay (including fasteners of all types), a releasable clip is employed in this preferred embodiment.

In a preferred embodiment of the present invention, the chassis is a chassis for a disk drive of a computer system. The disk drive may be a floppy disk drive, a hard disk drive and optical drive. Further, other chassis-based computer and non-computer equipment should benefit from the advantageous structure and method of the present invention. Those of ordinary skill in the art will recognize applications far beyond computer systems.

The foregoing has outlined rather broadly the features and technical advantages of the present invention so that the detailed description of the invention that follows may be better understood.

Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as broadly defined.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
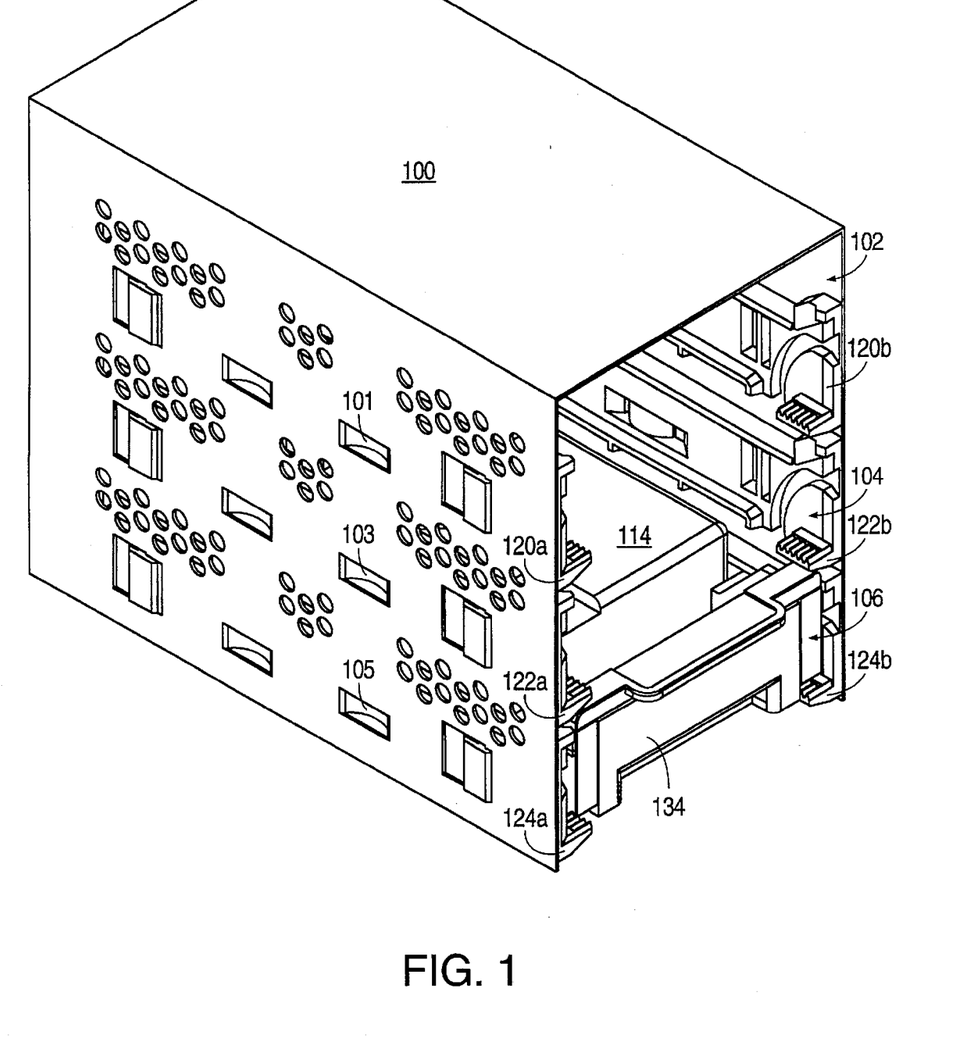
FIG. 1 illustrates an isometric view of a frame containing a plurality of bays, incorporating the carrier-based mounting structure of the present invention and containing a single hard disk drive.

Referring initially to FIG. 1, illustrated is an isometric view of a frame, generally designated 100 containing a plurality of bays 102, 104, 106, each of which bays 102, 104, 106 incorporates the carrier-based mounting structure of the present invention. Only the bay 106 is actually shown as containing a hard disk drive chassis 114.

Each bay 102, 104, 106 has mounted therein a pair of stationary mounts 120a, 120b, 122a, 122b, 124a, 124b. The stationary mounts 120a, 120b cooperate to provide a guide path within the bay 102 for a chassis carrier (not shown). Likewise, the stationary mounts 122a, 122b and the stationary mounts 124a, 124b cooperate to provide guide paths in the bays 104, 106, respectively, for other chassis carriers, including a chassis carrier 134 shown in a mounted position within the bay 106 and cradling the hard disk drive chassis 114. Details concerning specific features of the stationary mounts 120a, 120b, 122a, 122b, 124a, 124b and the chassis carrier 134 will follow with reference to subsequent FIGUREs.

Figure 2:
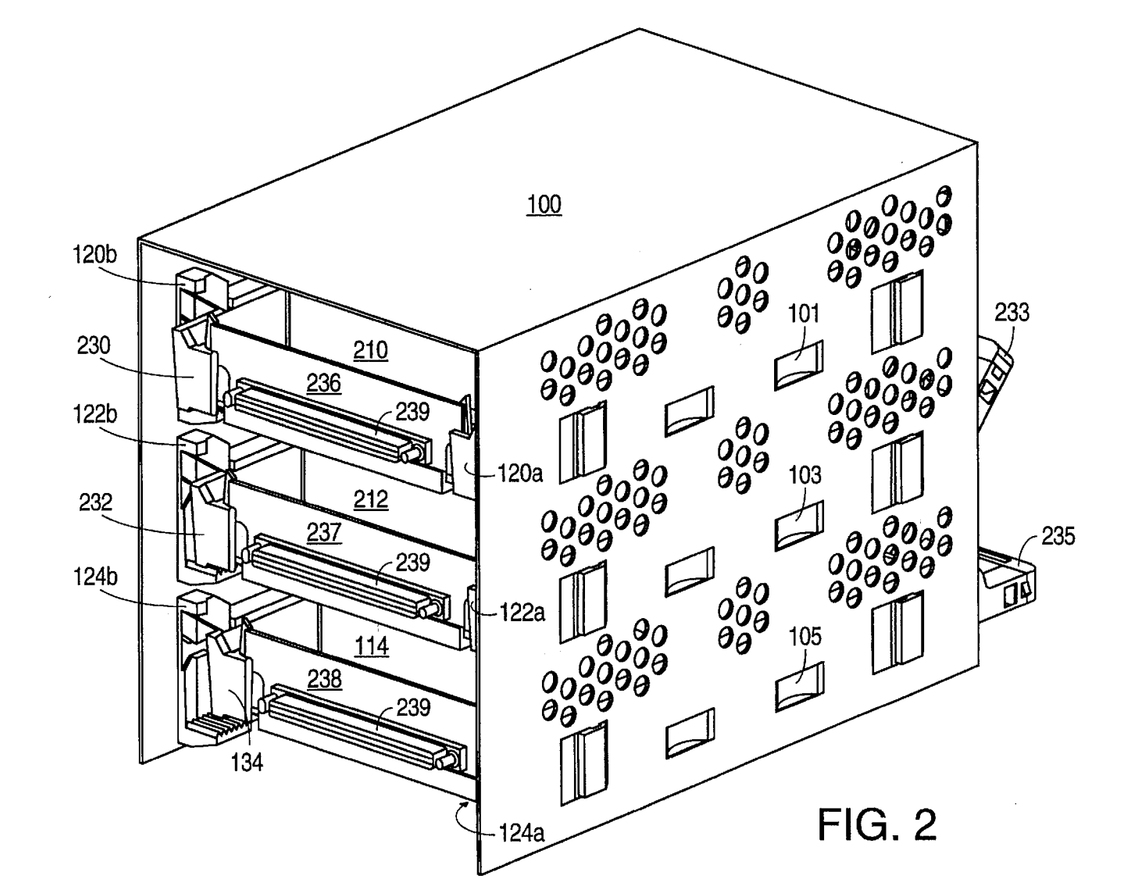
FIG. 2 illustrates a reverse-angle isometric view of the frame of FIG. 1 wherein the bays contain a plurality of hard disk drives.

Turning now to FIG. 2, illustrated is a reverse-angle isometric view of the frame 100 of FIG. 1 wherein the bays 102, 104, 106 contain a plurality of hard disk drives 210, 212, 114 cradled within corresponding chassis carriers 230, 232, 134. FIG. 2 is presented for two purposes. First, the chassis carriers 230, 232, 134 are shown in three successive positions with respect to the frame: the chassis carrier 230 is shown in a mounted position, the chassis carrier 232 is shown in an intermediate position and the chassis carrier 134 is shown in an insertion position. Although it is not as clear in FIG. 2 as it is in FIG. 3, rotatable mounting handles 233, 235 associated with the chassis carriers 232, 134, respectively, assume particular orientations as a function of the chassis carrier 232, 134 position. A mounting handle associated with the chassis carrier 230 is hidden in FIG. 2.

Second, FIG. 2 is presented for the purpose of showing circuit boards 236, 237, 238, associated with each of the chassis carriers 230, 232, 134. Certain types of chasses, for instance those containing hard disk drives for computer systems, have circuit boards associated therewith that contain interface hardware allowing communication of data between the hard disk drive and the computer system. The illustrated embodiment makes provision for the associated circuit boards 236, 237, 238 on the chassis carriers 230, 232, 134 and further provides an electrical ground (in a manner to be further detailed) for each of the circuit boards 236, 237, 238. Lances 101, 103, 105 associated with the bays 102, 104, 106 effect this electrical ground.

Figure 3:
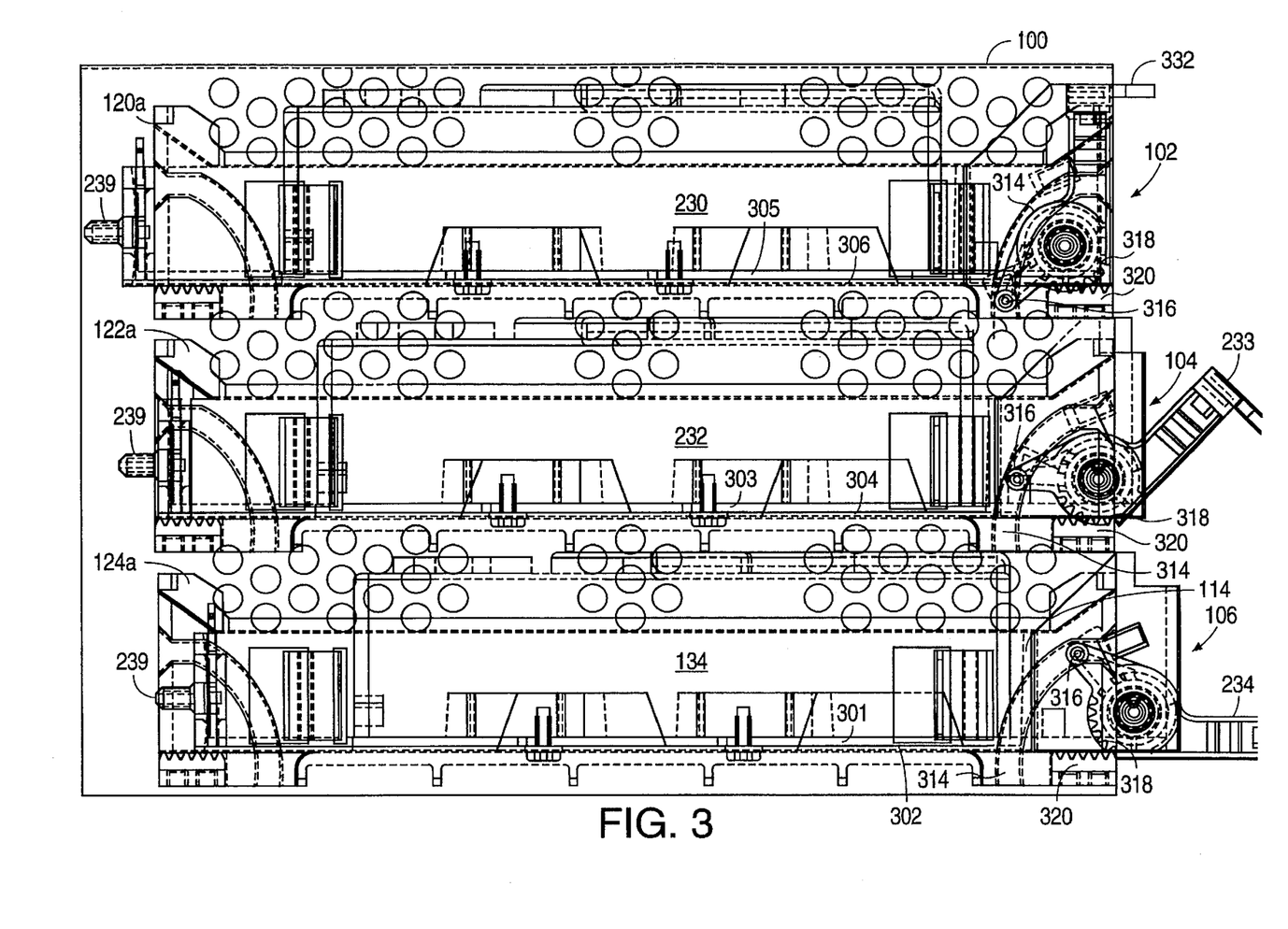
FIG. 3 illustrates a leftside elevational view of the frame of FIG. 1 showing, in particular, mounted, intermediate and insertion orientations for the mounting handle.

Turning now to FIG. 3, illustrated is a leftside elevational view of the frame of FIG. 1 showing, in particular, mounted, intermediate and insertion orientations for the mounting handles. Insertion of a chassis carrier into the frame 100 is best shown by successive reference to the chassis carrier 134, the chassis carrier 232 and the chassis carrier 234, in order.

When it is desired to mount a chassis (for instance, the hard disk drive chassis 114) within a bay (for instance, the bay 106) in the frame 100, a user should first engage first and second carrier guide rails (one of which is referenced as 302) of the chassis carrier 134 with corresponding first and second mount guide rails (one of which is referenced as 301) of the stationary mount 124a. Once engaged, the first and second carrier and mount guide rails 302, 301) provide a substantially linear path for the chassis carrier 134 as it traverses the bay 106. Before the chassis carrier 134 reaches its mounted position, however, a cam and gear arrangement comes into play. The cam and gear arrangement provides mechanical advantage for the user to mount the chassis carrier completely.

More specifically, and with reference back to FIG. 2, electrical connectors 239 associated with each of the circuit boards 236, 237, 238, provide electrical connections between the electronic equipment cradled in the chassis carriers 230, 232, 134 and other electronic equipment (such as data processing and storage circuitry and a power supply, in the case of a network server). The electrical connectors 239 have significant insertion and separation forces associated therewith, as those of ordinary skill in the art understand. The cam and gear arrangement of the present invention, which comes into play near the end of the chassis carrier's travel and as the electrical connector 239 begins to mate, provides mechanical advantage to the user, thereby diminishing the force necessary to overcome the electrical connector's resistance to insertion or separation.

Returning to FIG. 3, the stationary mount 124a has a cam slot 314 associated therewith. The cam slot 314 receives a cam follower 316 associated with the mounting handle 234 only when the mounting handle 234 is in an insertion orientation, as shown. The cam slot 314 and the cam follower thus ensure that the mounting handle 234 is aligned correctly prior to allowing further travel of the chassis carrier 134. At about the same time as the cam follower 316 engages the cam slot 314, a pinion gear 318 associated with the rotatable mounting handle 234 engages a rack gear 320 associated with the stationary mount 124a. The pinion gear 318 and rack gear 320 have gripping surfaces thereon (in this case, gear teeth) that allow the gears 318, 320 to transmit forces therebetween without slippage.

To continue mounting the chassis carrier 134, the user must now begin to rotate the mounting handle 234 from its insertion orientation to its mounted orientation, and thus traverse an intermediate orientation. The mounting handle 233 is shown in such intermediate orientation. As the mounting handle 233 is rotated, the cam follower 316 traverses the cam slot 314 and the pinion gear 318 meshes with, and rotates along, the rack gear 320, thereby providing a mechanical advantage equal to the ratio of the distance of the outer end of the mounting handle 233 from the center of rotation divided by the radius of the pinion gear 318 (about 3:1, as illustrated). This mechanical advantage effectively divides the electrical connector's insertion force by approximately 3.

Finally, the user completes the mounting of the chassis carrier (now referenced as 230) by fully rotating the mounting handle (now referenced as 332) into its mounted orientation. Near the end of its travel in the cam slot 314, the cam follower 316 encounters a retention structure, to be described more completely with reference to FIG. 7, that provides a detent to hold the cam follower 316 releasably in place. The retention structure therefore maintains the chassis carrier 230 in its mounted position.

To dismount the chassis carrier 230, the user need only overcome the detent force of the retention structure and rotate the mounting handle 332 into its insertion orientation. This separates the electrical connector 239 and places the chassis carrier (now referenced as 134) in condition to be slid outwardly from the frame 100.

Figure 4:
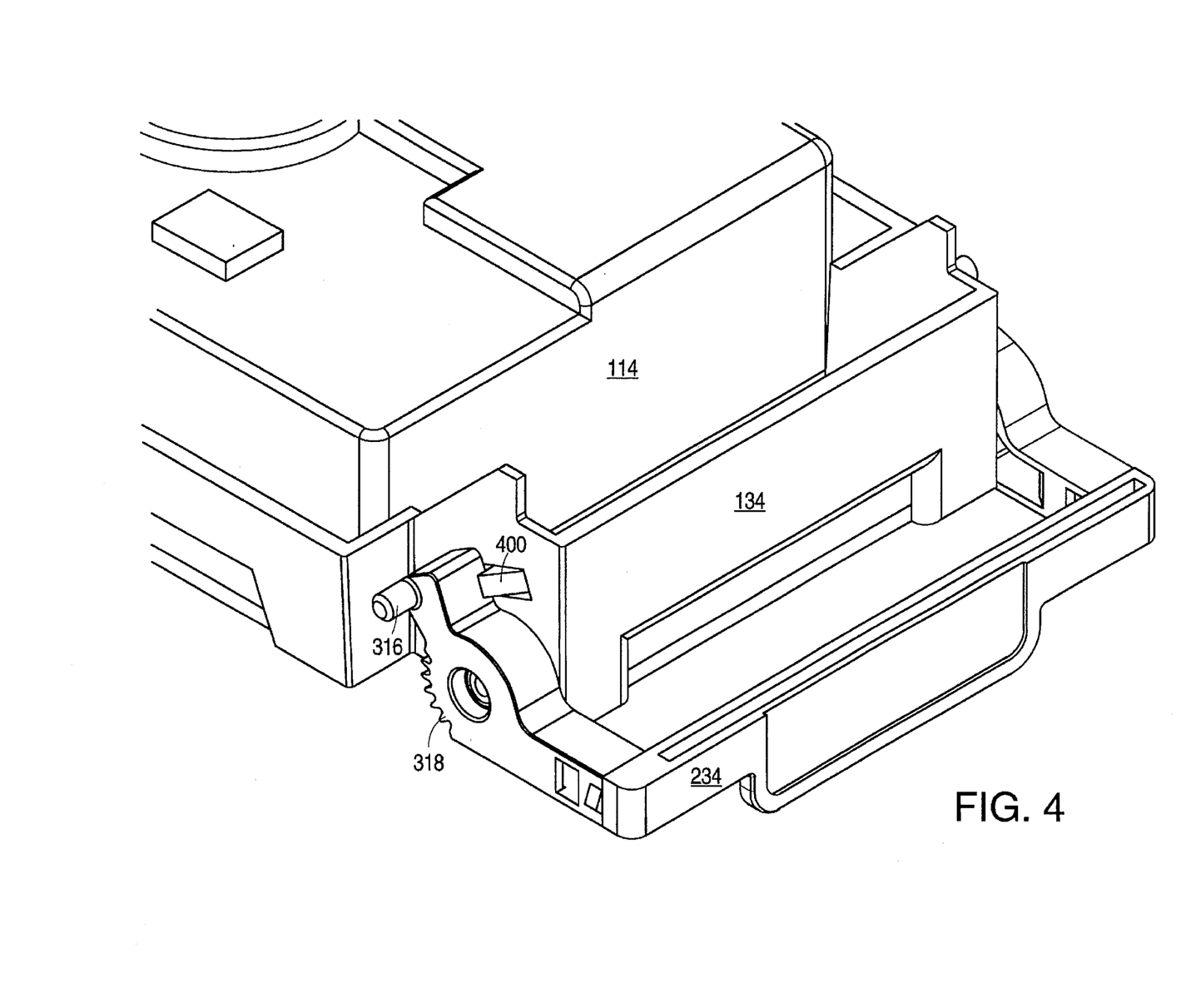
FIG. 4 illustrates an isometric view of the chassis carrier according to the present invention having a hard disk drive chassis cradled therein.

Turning now to FIG. 4, illustrated is an isometric view of the chassis carrier 134 according to the present invention having a hard disk drive chassis 114 cradled therein. FIG. 4 is presented primarily for the purpose of showing the mounting handle 234, and its associated cam follower 316 and pinion gear 318, isometrically. It is apparent in FIG. 4 that the mounting handle 234 is suitable for carrying the chassis carrier 134 when it is separated from the frame 100. A stop 400 prevents the mounting handle from over-rotating.

Figure 5:
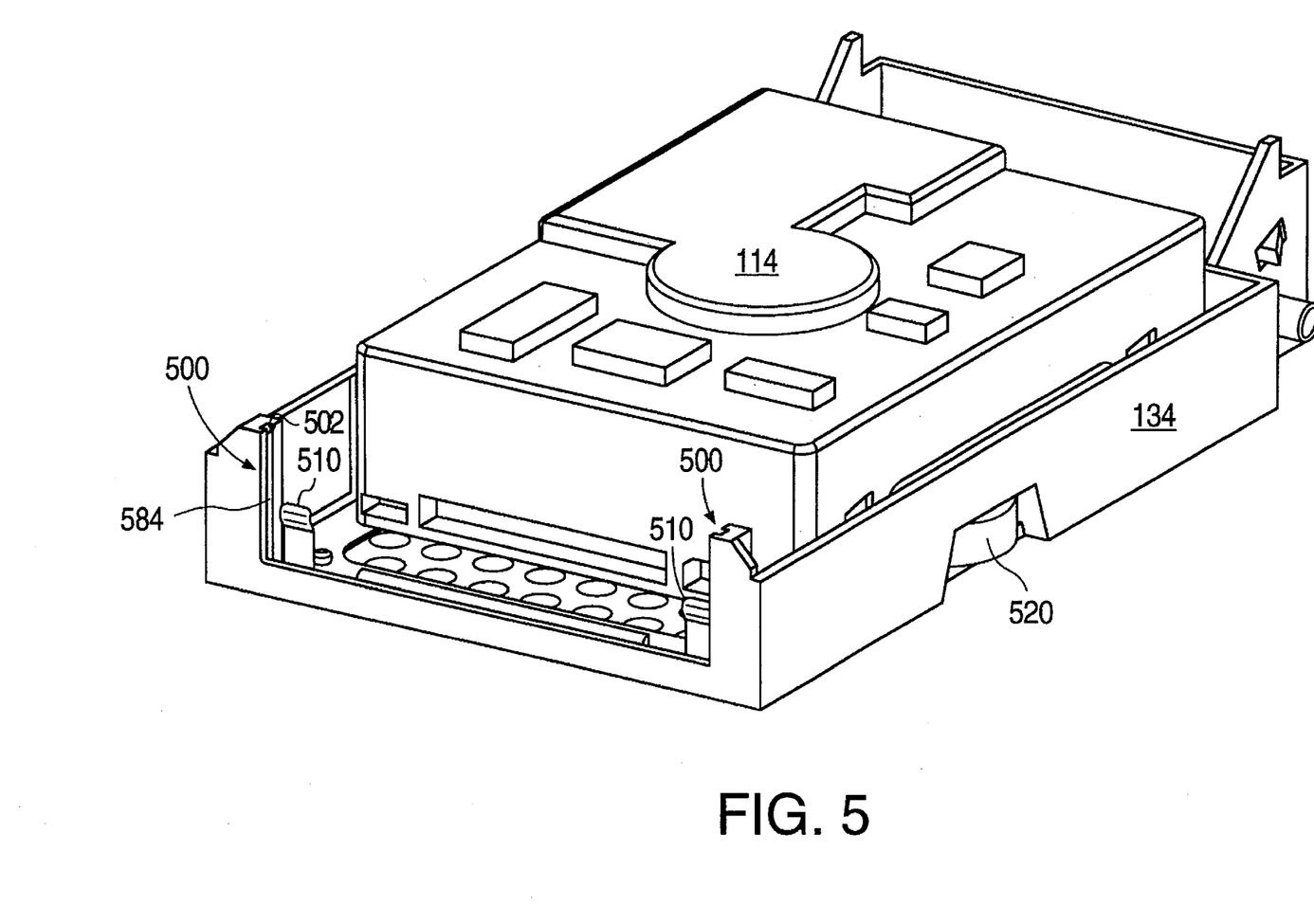
FIG. 5 illustrates a reverse-angle isometric view of the chassis carrier and chassis of FIG. 4 showing, in particular, a circuit board slot and grounding clip associated with the chassis carrier.

Turning now to FIG. 5, illustrated is a reverse-angle isometric view of the chassis carrier 134 and hard disk drive chassis 114 of FIG. 4 showing, in particular, a circuit board slot 500 and grounding clips 510 associated with the chassis carrier. The circuit board slot 500 has chamfered lead-in grooves 502 and lower reverse-draft grooves 504 for receiving the circuit board (for instance, the circuit board 238 of FIG. 2) and allowing the circuit board 238 to float within the slot 500. The grounding clips 510 resiliently bear against the circuit board 238, maintaining electrical contact therewith for grounding and EMI suppression purposes, and also providing spring forces necessary for the board to float in the carrier. Electrical contact between the grounding clips 510 and the frame 100 (of FIGS. 1 and 2) is maintained by resilient contacts (only one of which is illustrated and referenced as 520) that extend laterally from a sidewall of the chassis carrier 134 to contact corresponding lances 101, 103, 105 of the frame 100, all of FIG. 1.

Figure 6:
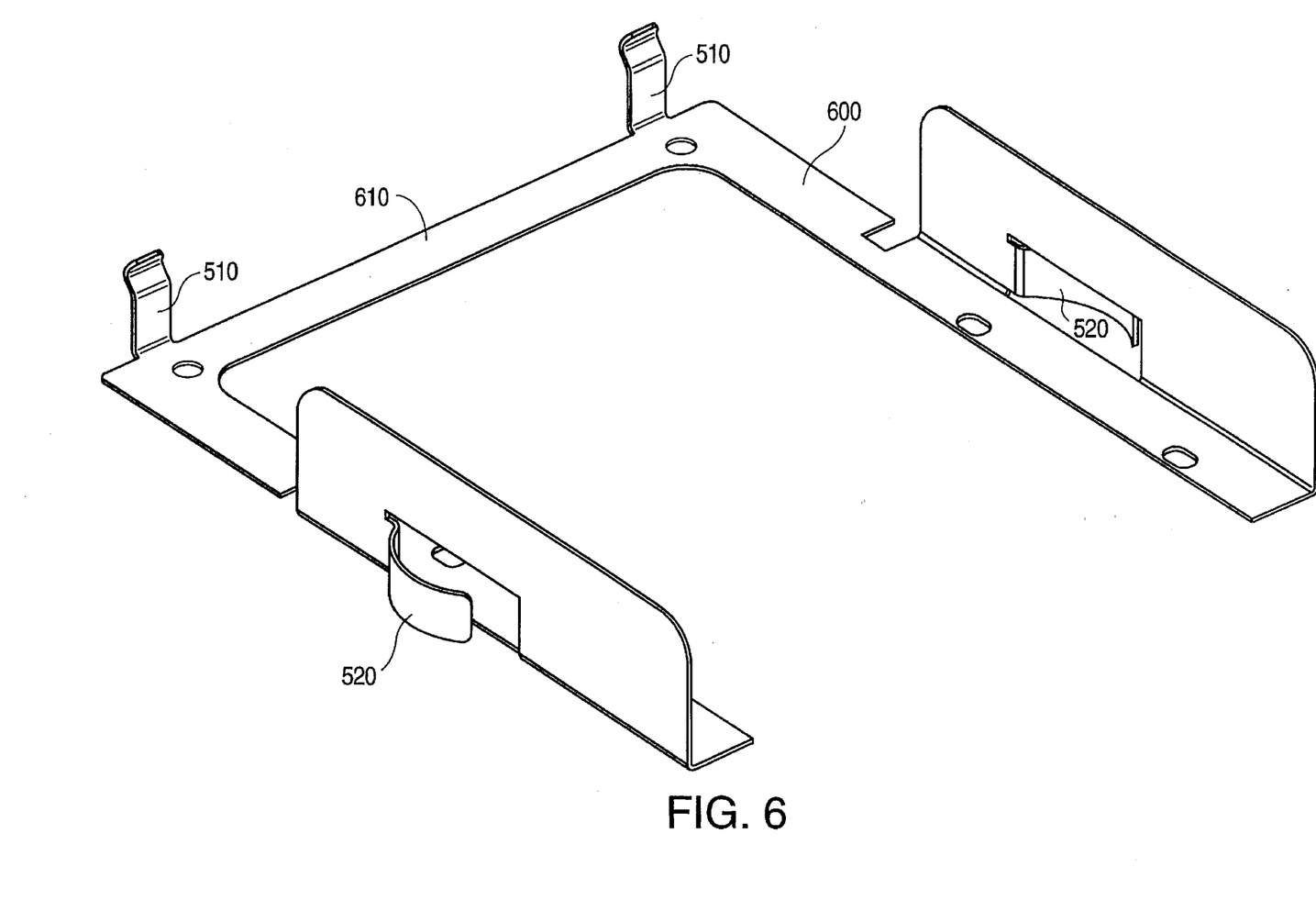
FIG. 6 illustrates an isometric view of a grounding conductor according to the present invention.

Turning now to FIG. 6, illustrated is an isometric view of a grounding conductor 600 according to the present invention. The grounding conductor 600 contains the grounding clips 510 and the resilient contacts 520 that electrically couple the circuit board to the frame. Further, a base plate 610 contacts the hard disk drive chassis (not shown) to ground the same. The grounding conductor is designed to fit within a cradle formed by the chassis carrier 230, 232, 134.

Figure 7:
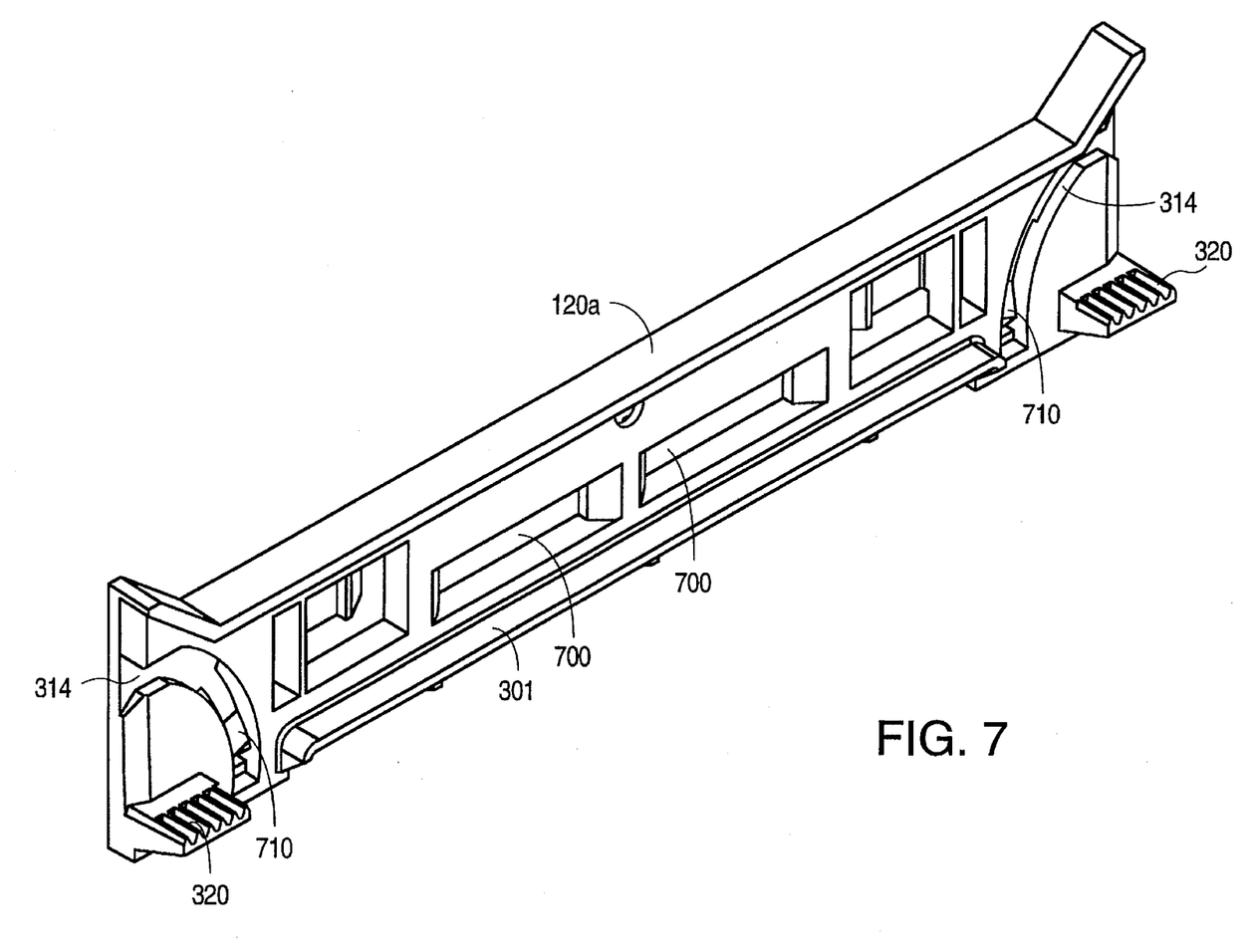
FIG. 7 illustrates an isometric view of a stationary mount according to the present invention.

Turning now to FIG. 7, illustrated is an isometric view of a stationary mount (such as the stationary mount 120a) according to the present invention. The stationary mount 120a, again, comprises cam slots 314 and rack gears 320 on both ends thereof. This allows the stationary mount 120a to be universally mountable to either side of the bays 102, 104, 106. A mount guide rail 301 is engageable with a corresponding carrier guide rail (not shown) to allow the associated chassis carrier to traverse the bay. Through-holes 700 allow the lances 101, 103, 105 of FIG. 1 to pass therethrough to contact the resilient contacts (520 of FIG. 5) to make electrical contact therewith. Finally, a retention structure, illustrated as including a cantilevered ramp 710, provides a detent to hold the cam follower 316 releasably in place to maintain the associated chassis carrier in its mounted position. It should be understood that the cantilevered ramp 710 could also be replaced with a general snap/detent feature that is engaged between the handle and the rail, without departing from the scope of this invention.

Figure 8:
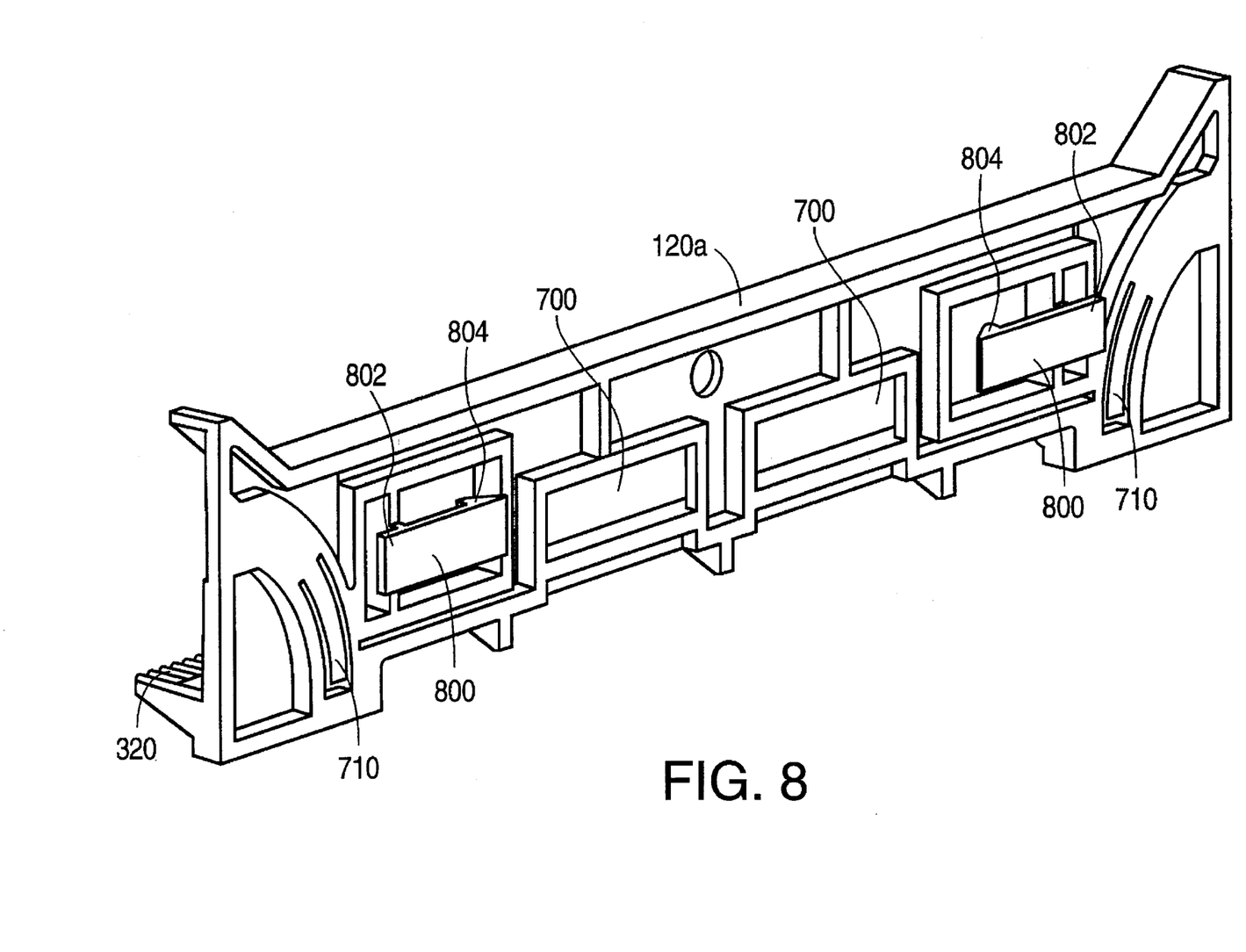
FIG. 8 illustrates a reverse-angle isometric view of the stationary mount of FIG. 7.

Turning now to FIG. 8, illustrated is a reverse-angle isometric view of the stationary mount of FIG. 7. In addition to those features described with respect to FIG. 7, FIG. 8 shows clips 800 adapted releasably to couple the stationary mount 120a to the walls of each bay 102, 104, 106. Each clip 800 has a camming shoulder 802 and a snap 804 associated therewith. In the illustrated embodiment, since the stationary mount 120a is universal, the camming shoulder 802 of one clip 800 cooperates with the snap 804 of the other clip 800 to secure the stationary mount 120a to the frame 100.

From the above description, it is apparent that the present invention provides a structure and method for removably mounting a chassis within a bay in a frame. The structure comprises: (1) a stationary mount coupled to an inner wall of the bay, the stationary mount having a mount guide rail and a cam slot associated therewith, (2) a chassis carrier having a cradle associated therewith for receiving a chassis and a carrier guide rail on an outer surface thereof and (3) a mounting handle, rotatably coupled to the chassis carrier to rotate between an insertion orientation and a mounted orientation, the mounting handle having a cam follower associated therewith, the mount and carrier guide rails engageable to guide the chassis carrier along a substantially linear path through the bay, the cam follower engageable with the cam slot only when the mounting handle is substantially in the insertion orientation, the cam follower traversing the cam slot to urge the chassis carrier along the substantially linear path toward a mounted position as the mounting handle is rotated toward the mounted orientation.

An additional advantage found in the design of the above described guide rails is that since all of the features of each rail are mirrored, each rail can be used on either the left side or the right side of the drive bay.

Although the present invention and its advantages have been described in detail, it should be understood that various changes, substitutions and alterations can be made herein without departing from the spirit and scope of the invention as broadly defined.

What is claimed is:

1. A structure for removably mounting a chassis within a bay in a frame, comprising:
   a stationary mount coupled to an inner wall of said bay, said stationary mount having a mount guide rail, a first gripping surface, and a cam slot associated therewith;
   a chassis carrier having a cradle associated therewith for receiving a chassis and a carrier guide rail on an outer surface thereof; and
   a mounting handle, rotatably coupled to said chassis carrier to rotate between an insertion orientation and a mounted orientation, said mounting handle having a cam follower and a second gripping surface associated therewith, said mount and carrier guide rails engageable to guide said chassis carrier along a substantially linear path through said bay, said cam follower engageable with said cam slot only when said mounting handle is substantially in said insertion orientation, said cam follower traversing said cam slot and said second gripping surface engaging said first gripping surface to urge said chassis carrier along said substantially linear path toward a mounted position as said mounting handle is rotated toward said mounted orientation.

2. The structure as recited in claim 1 further comprising a second stationary mount coupled to an opposing inner wall of said bay, said second stationary mount having a second mount guide rail and a second cam slot associated therewith, said mounting handle having a second cam follower associated therewith, said second mount and carrier guide rails engageable to guide said chassis carrier along said substantially linear path, said second cam follower engageable with said second cam slot only when said mounting handle is substantially in said insertion orientation, said second cam follower traversing said second cam slot to urge said chassis carrier along said substantially linear path toward said mounted position as said mounting handle is rotated toward said mounted orientation.

3. The structure as recited in claim 1 wherein said chassis carrier has a grounding conductor associated therewith, said grounding conductor couplable to said chassis when said chassis is received into said cradle, said grounding conductor having a resilient contact associated therewith, said resilient contact couplable to said frame to ground said chassis to said frame when said chassis carrier is in said mounted position.

4. The structure as recited in claim 1 wherein said chassis carrier has a circuit board slot and a grounding clip associated therewith, said circuit board slot adapted to receive a circuit board associated with said chassis, said grounding clip adapted to contact said circuit board resiliently to provide a ground for said circuit board.

5. The structure as recited in claim 1 wherein said stationary mount has a duality of cam slots and first gripping surfaces on opposite ends thereof, said stationary mount couplable to a selected one of said inner wall and an opposing inner wall of said bay.

6. The structure as recited in claim 1 wherein said frame comprises a plurality of bays, each of said bays operable with said structure to receive said chassis.

7. The structure as recited in claim 1 wherein said cam slot comprises a retention structure, said retention structure engageable with said cam follower when said mounting handle is in said mounted orientation releasably to retain said chassis carrier in said mounted position.

8. The structure as recited in claim 1 wherein said stationary mount comprises a clip for releasably coupling said stationary mount to said inner wall of said bay.

9. The structure as recited in claim 1 wherein said chassis is a chassis for a disk drive of a computer system.

10. The structure as recited in claim 1 further comprising a second stationary mount coupled to an opposing inner wall of said bay, said second stationary mount having a second mount guide rail, a third gripping surface, and a second cam slot associated therewith, said mounting handle having a second cam follower and a fourth gripping surface associated therewith, said second mount and carrier guide rails engageable to guide said chassis carrier along said substantially linear path, said second cam follower engageable with said second cam slot only when said mounting handle is substantially in said insertion orientation, said second cam follower traversing said second cam slot and said fourth gripping surface engaging said third gripping surface to urge said chassis carrier along said substantially linear path toward said mounted position as said mounting handle is rotated toward said mounted orientation.

11. A method for removably mounting a chassis within a bay in a frame, comprising the steps of:

engaging a carrier guide rail of a chassis carrier with a mount guide rail of a stationary mount coupled to an inner wall of said bay, said stationary mount having a cam slot and a first gripping surface associated therewith, said chassis carrier having a cradle associated therewith for receiving a chassis and a mounting handle rotatably coupled to said chassis carrier to rotate between an insertion orientation and a mounted orientation, said mounting handle having a cam follower and a second gripping surface associated therewith, said mount and carrier guide rails engageable to guide said chassis carrier along a substantially linear path through said bay;

engaging said cam follower with said cam slot only when said mounting handle is substantially in said insertion orientation; and traversing said cam slot with said cam follower and engaging said first gripping surface with said second gripping surface to urge said chassis carrier along said substantially linear path toward a mounted position as said mounting handle is rotated toward said mounted orientation.

12. The method as recited in claim 11 further comprising a second stationary mount coupled to an opposing inner wall of said bay, said second stationary mount having a second mount guide rail, a third gripping surface, and a second cam slot associated therewith, said mounting handle having a second cam follower and a fourth gripping surface associated therewith, said method further comprising the steps of:

engaging said second mount and carrier guide rails to guide said chassis carrier along said substantially linear path;

engaging said second cam follower with said second cam slot only when said mounting handle is substantially in said insertion orientation; and traversing said second cam slot with said second cam follower and engaging said third gripping surface with said fourth gripping surface to urge said chassis carrier along said substantially linear path toward said mounted position as said mounting handle is rotated toward said mounted orientation.

13. The method as recited in claim 11 wherein said chassis carrier has a grounding conductor associated therewith, said grounding conductor couplable to said chassis when said chassis is received into said cradle, said grounding conductor having a resilient contact associated therewith, said method further comprising the step of coupling said resilient contact to said frame to ground said chassis to said frame when said chassis carrier is in said mounted position.

14. The method as recited in claim 11 wherein said chassis carrier has a circuit board slot and a grounding clip associated therewith, said circuit board slot adapted to receive a circuit board associated with said chassis, said method further comprising the step of resiliently contacting said circuit board with said grounding clip to provide a ground for said circuit board.

15. The method as recited in claim 11 wherein said stationary mount has a duality of cam slots and gripping surfaces on opposite ends thereof, said method further comprising the step of coupling said stationary mount to a selected one of said inner wall and an opposing inner wall of said bay.

16. The method as recited in claim 11 wherein said frame comprises a plurality of bays, said method further comprising the step of adapting each of said bays to receive said chassis.

17. The method as recited in claim 11 wherein said cam slot comprises a retention structure, said method further comprising the step of engaging said cam follower with said retention structure when said mounting handle is in said mounted orientation releasably to retain said chassis carrier in said mounted position.

18. The method as recited in claim 11 further comprising the step of releasably coupling said stationary mount to said inner wall of said bay with a clip coupled to said stationary mount.

19. The method as recited in claim 11 wherein said chassis is a chassis for a disk drive of a computer system.

20. A structure for removably mounting a computer peripheral chassis within a bay in a frame, comprising:

first and second stationary mounts coupled to opposing sidewalls of said bay, said first and second stationary mounts having first and second mount guide rails, first and second cam slots and first and second rack gears associated therewith, respectively;

a chassis carrier having a cradle associated therewith for receiving a computer peripheral chassis and first and second carrier guide rails on opposing outer surfaces thereof; and a mounting handle, rotatably coupled to said chassis carrier to rotate between an insertion orientation and a mounted orientation, said mounting handle having first and second cam followers and first and second pinion gears on opposing sides thereof, said first and second mount and carrier guide rails engageable to guide said chassis carrier along a substantially linear path through said bay, said first and second cam followers engageable with said first and second cam slots, respectively, only when said mounting handle is substantially in said insertion orientation, said first and second cam followers traversing said first and second cam slots, respectively, and said first and second pinion gears engaging said first and second rack gears, respectively, to urge said chassis carrier along said substantially linear path toward a mounted position as said mounting handle is rotated toward said mounted orientation.

21. The structure as recited in claim 20 wherein said chassis carrier has a grounding conductor associated therewith, said grounding conductor couplable to said chassis when said chassis is received into said cradle, said grounding conductor having a resilient contact associated therewith, said resilient contact couplable to said frame to ground said chassis to said frame when said chassis carrier is in said mounted position.

22. The structure as recited in claim 20 wherein said chassis carrier has a circuit board slot and a grounding clip associated therewith, said circuit board slot adapted to receive a circuit board associated with said computer peripheral chassis, said grounding clip adapted to contact said circuit board resiliently to provide a ground for said circuit board.

23. The structure as recited in claim 20 wherein said first and second stationary mounts each have a duality of cam slots and rack gears on opposite ends thereof, said first and second stationary mounts thereby being interchangeable.

24. The structure as recited in claim 20 wherein said frame comprises a plurality of bays, each of said bays operable with said structure to receive said chassis.

25. The structure as recited in claim 20 wherein said first and second cam slots comprise first and second retention structures, respectively, said first and second retention structures engageable with said first and second cam followers, respectively, when said mounting handle is in said mounted orientation releasably to retain said chassis carrier in said mounted position.

26. The structure as recited in claim 20 wherein said first and second stationary mounts each comprise a duality of clips for releasably coupling said first and second stationary mounts to said opposing sidewalls of said bay.

27. The structure as recited in claim 20 wherein said computer peripheral chassis is a chassis of a hard disk drive of a computer system.

* * * * *